(12) United States Patent
Dobbins

(10) Patent No.: US 8,111,967 B2
(45) Date of Patent: Feb. 7, 2012

(54) MECHANICAL SPLICE

(75) Inventor: Patrick E. Dobbins, Greer, SC (US)

(73) Assignee: AFL Telecommunications LLC, Spartanburg, SC (US)

( * ) Notice: Subject to any disclaimer, the term of this patent is extended or adjusted under 35 U.S.C. 154(b) by 187 days.

(21) Appl. No.: 12/446,345

(22) PCT Filed: Oct. 6, 2008

(86) PCT No.: PCT/US2008/078898
§ 371 (c)(1),
(2), (4) Date: Nov. 20, 2009

(87) PCT Pub. No.: WO2009/046402
PCT Pub. Date: Apr. 9, 2009

(65) Prior Publication Data
US 2010/0316339 A1 Dec. 16, 2010

Related U.S. Application Data

(60) Provisional application No. 60/977,983, filed on Oct. 5, 2007.

(51) Int. Cl.
*G02B 6/255* (2006.01)
*G02B 6/00* (2006.01)

(52) U.S. Cl. .............. 385/135; 385/52; 385/97; 385/99; 385/137

(58) Field of Classification Search .............. 385/95–99, 385/134–137, 52
See application file for complete search history.

(56) References Cited

U.S. PATENT DOCUMENTS

| 4,327,964 | A | 5/1982 | Haesly et al. |
| 5,963,699 | A * | 10/1999 | Tanaka et al. .................. 385/97 |
| 5,984,532 | A | 11/1999 | Tamaki et al. |
| 7,346,255 | B2 * | 3/2008 | Yamaguchi et al. .......... 385/136 |
| 2006/0104590 | A1 | 5/2006 | Yamaguchi et al. |

* cited by examiner

*Primary Examiner* — Daniel Petkovsek
(74) *Attorney, Agent, or Firm* — Sughrue Mion, PLLC

(57) ABSTRACT

A mechanical splice apparatus including a mechanical splice with a groove and an aligning component with a wedge. When the wedge is engaged in the groove of the mechanical splice an opening is formed in the mechanical splice and when the wedge is disengaged from the groove, the opening closes.

6 Claims, 4 Drawing Sheets

MECHANICAL SPLICE

CROSS-REFERENCE TO RELATED APPLICATIONS

This application claims the benefit of Provisional Application No. 60/977,983 filed Oct. 5, 2007. The entire disclosure of the prior application, Application No. 60/977,983, is hereby incorporated by reference.

BACKGROUND OF THE INVENTION

1. Field of the Invention

Apparatuses consistent with the present invention relate to mechanical splices. More particularly, the present invention relates to mechanical splicing optical fibers that includes a component for aligning and the fibers that are being spliced.

2. Description of the Related Art

In order to join fibers from multiple cable reels, the optical fiber must be either fusion spliced or mechanically spliced to align the fiber cores prior to joining the ends to allow optical energy to past from one fiber to the next. Depending on the quality of the alignment there is loss associated with such fiber joints.

In using fusion splicing there is a high cost of the equipment, special skill levels of the technician and precision equipment required to prepare the fiber to make this joint. In mechanical splicing of optical fibers, there are high losses and special apparatuses or tools required to precisely align the optical cores of the fiber. All existing fiber optic mechanical splices use some type of special tool or apparatus to assemble the mechanical splice and precisely align the optical core of the fiber. These special tools are an additional cost and add an element of additional complexity in order to facilitate making a low loss mechanical splice joint between optical fibers.

The fibers are first prepared by having their protective coating removed, the fiber cleaned in pure alcohol and the end faced cleaved to provide a flat endface. This is the same process for all splicing, either fusion or mechanical. The special tools required for mechanical splicing are to open the elastomer that precisely aligns the fiber cores by a precision V-groove in the elastomer. Once both fibers are aligned the tool closes the V-groove and the fibers are held in place and in alignment by the closed elastomer. The problem that need to be addressed is that these special tools are costly, cumbersome, and need to be replaced and repaired.

It is an object of this invention to provide a mechanical splice that is pre-equipped with a component that can open and close the elastomer, thus eliminating the need for a special tool to complete the splice.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

According to an aspect of the present invention, there is provided a mechanical splice apparatus, including a mechanical splice with a groove; and an aligning component with a wedge; wherein when the wedge is engaged in the groove of the mechanical splice an opening is formed in the mechanical splice and when the wedge is disengaged from the groove, the opening closes.

According to another aspect of the present invention, there is provided a mechanical splice apparatus wherein the mechanical splice includes a plurality of grooves; wherein the aligning component includes a plurality of wedges and wherein when the wedges are engaged in the grooves of the mechanical splice openings are formed in the mechanical splice and when the wedge is disengaged from the grooves, the openings close.

According to another aspect of the present invention, there is provided a mechanical splice apparatus that also includes a second aligning component.

According to another aspect of the present invention, there is provided a mechanical splice apparatus wherein the aligning component includes a plurality of structures that, when forces are asserted on the structures, the wedge disengages from the groove.

According to another aspect of the present invention, there is provided a mechanical splice apparatus wherein the aligning component includes a structure that, when a forces is asserted on the structure, the wedge engages in the groove.

BRIEF DESCRIPTION OF THE DRAWINGS

These and/or other aspects of the present invention will become apparent and more readily appreciated from the following description of the exemplary embodiments, taken in conjunction with the accompanying drawings, in which.

DETAILED DESCRIPTION OF THE INVENTION

Figure 1:
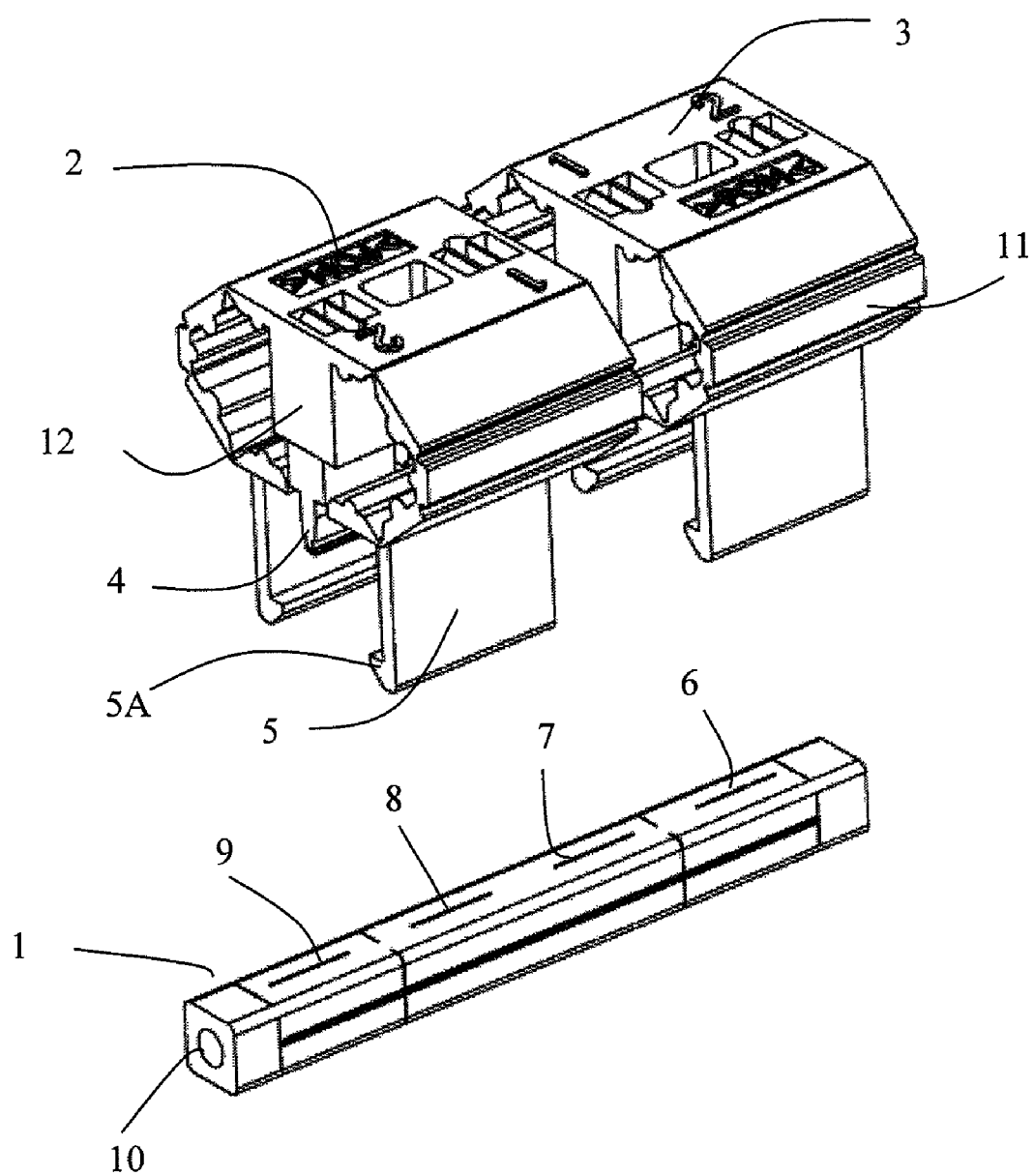
FIG. 1 is a perspective view illustrating an exemplary embodiment of an unassembled mechanical splice.

In the following description, same drawing reference numerals are used for the same elements even in different drawings. The matters defined in the description, such as detailed construction and element descriptions, are provided to assist in a comprehensive understanding of the invention. Also, well-known functions or constructions are not described in detail since they would obscure the invention in unnecessary detail.

FIG. 1 is a perspective view illustrating an exemplary embodiment of an unassembled mechanical splice. As illustrated in FIG. 1, the apparatus includes a mechanical splice 1 and two aligning components 2, 3 that are used in the splicing process. The mechanical splice 1 contains two holes 10, on either end (the second hole is not shown), where the fibers to be spliced are inserted. Four grooves 6, 7, 8, 9, are on the top of the mechanical splice 1. The grooves extend past the center point 30 of the elastomer when the fiber will reside (see FIG. 4). Although this embodiment has four grooves. The mechanical splice could have fewer (at least two) or more grooves.

Figure 4:
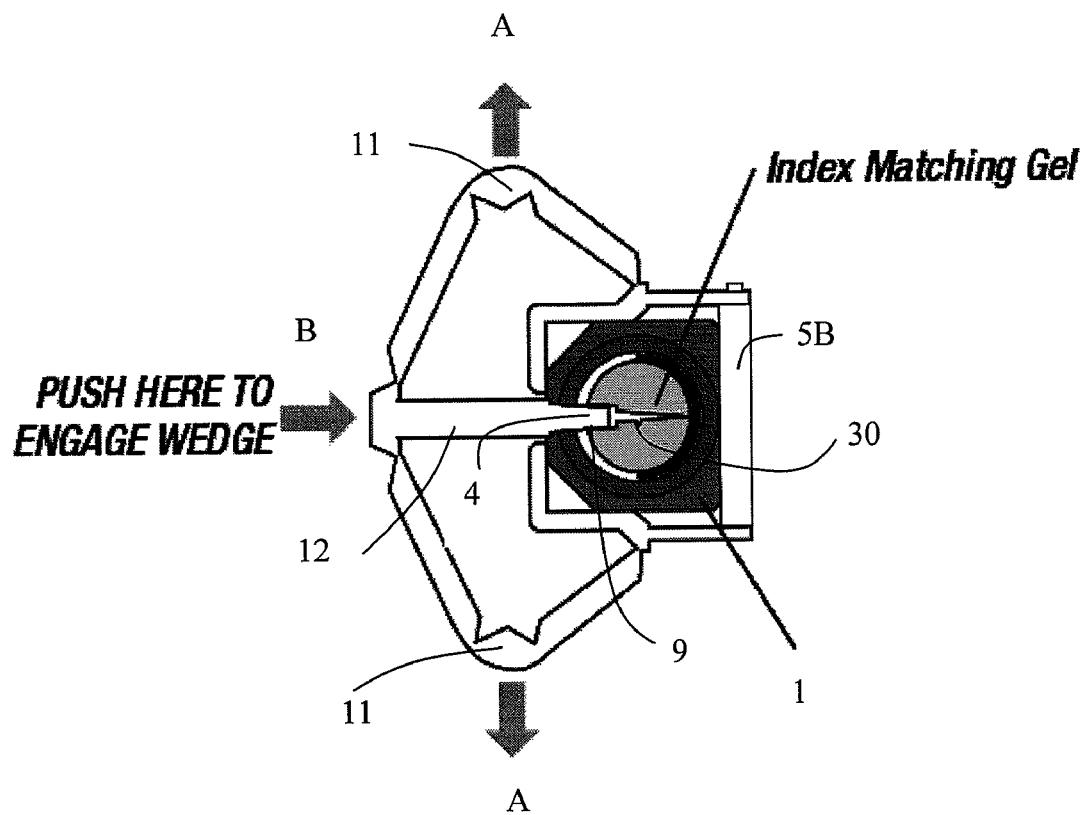
FIGS. 4 and 5 are cross sectional views illustrating the operation of an exemplary embodiment of the mechanical splice.

The aligning components 2, 3 include a portion 5 that holds the mechanical splice 1. The mechanical splice 1 can be held for example, by a clip 5A, a piece that 5B that covers the entire bottom of the mechanical splice 1 (as shown in FIG. 4), or by other suitable means. The aligning components 2, 3 also include wedges 4, that can be inserted into the grooves 6, 7, 8, 9. The wedges do not need to be shaped like a wedge. Any other suitable shape that can be inserted into the grooves and force open a channel or hole for the fiber to be inserted would be acceptable. The wedges 4 are attached to the aligning splices 2, 3, by supports 12. The supports 12 can be integrally formed with the wedges 4.

The aligning splices 2, 3, also include structures or "wings" 11, which are used to remove the wedges 4 from the grooves 6, 7, 8, 9.

Figure 2:
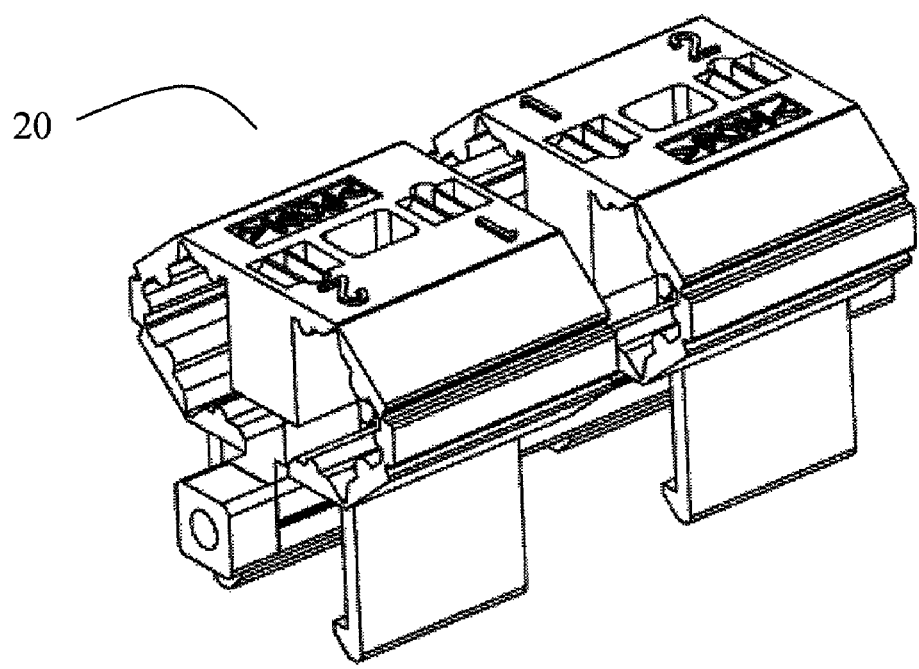
FIG. 2 is a perspective view illustrating an exemplary embodiment of an assembled mechanical splice.
Figure 3:
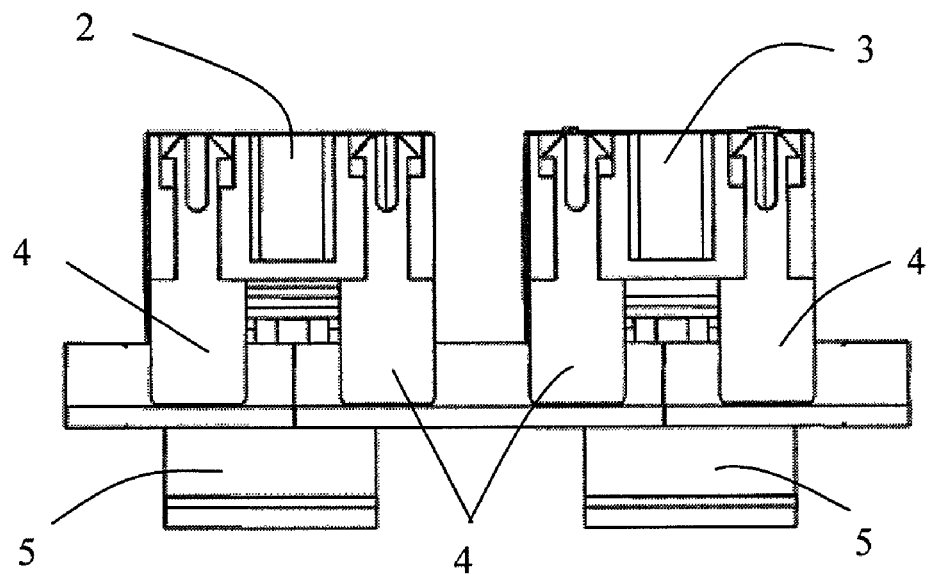
FIG. 3 is a cross sectional view illustrating an exemplary embodiment of the mechanical splice.
Figure 5:
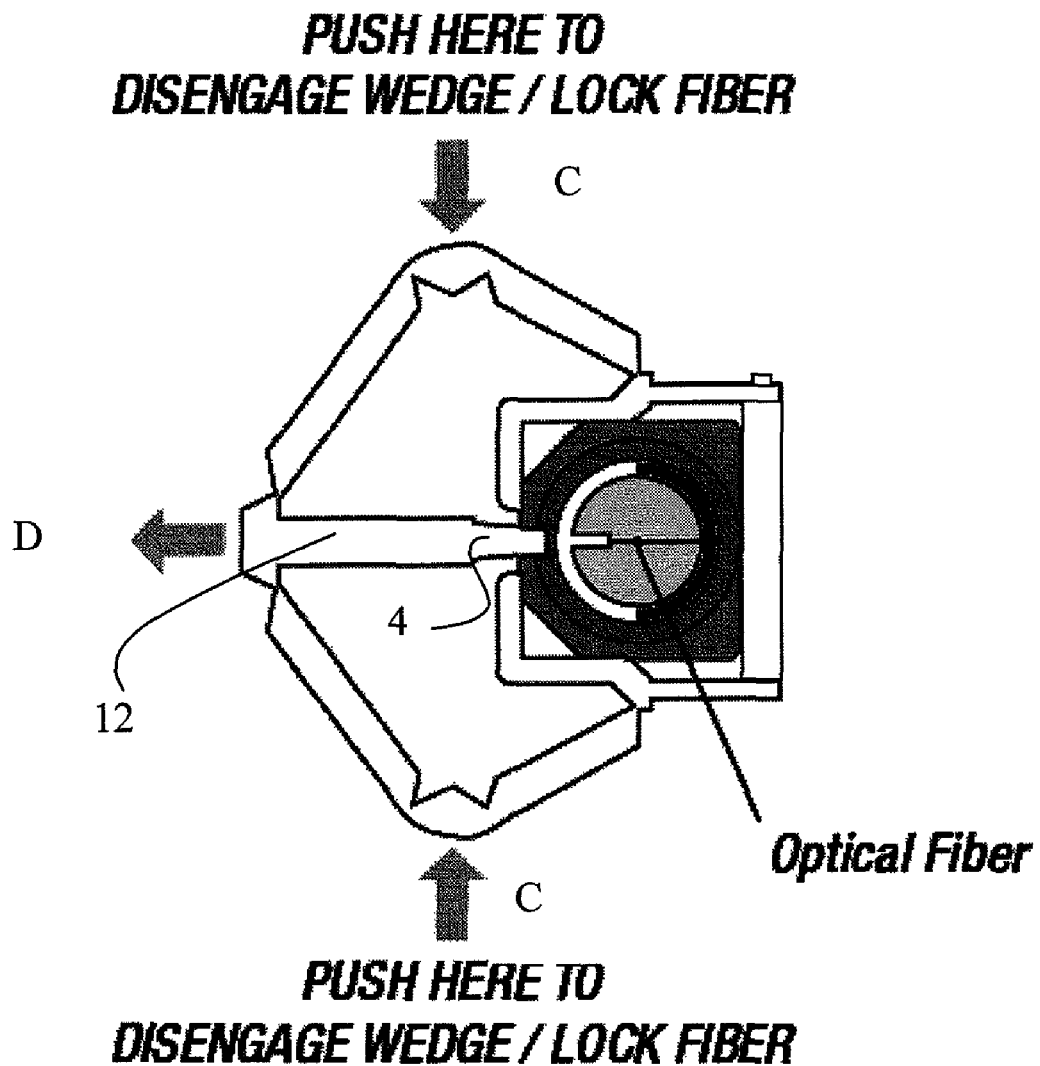

Next, the assembly of the mechanical splice will be described. The aligning components 2, 3 are either pushed over the mechanical splice 1 and held together by the clips 5A (see FIGS. 1 and 2), or the mechanical splice 1 is slid through the aligning components 2, 3 (see FIG. 5). At this point, the wedges 4 are not inserted into the grooves 6, 7, 8, 9. Next, after aligning the wedges 4 over the grooves 6, 7, 8, 9, the wedges 4 are inserted into the grooves by using a force B (see FIG. 4). The "wings" 11 move out in direction A. The wedges 4 remain engaged in the grooves by for example, friction force, or by clips or other means (not shown). When the wedges are engaged, the elastomer is forced open to create an opening such that an optical fiber can be inserted into the opening in the mechanical splice. For example, FIG. 4 shows slight opening around the center point 30, where the fiber will reside. The mechanical splice 20 can now be used to splice two fibers.

Next, the slicing operation will be described. The fibers are first prepared by having their protective coating removed, the fiber cleaned in pure alcohol and the end faced cleaved to provide a flat endface. The fibers are inserted into holes 10 of the mechanical splice 1 until the two endfaces meet at approximately the middle of the mechanical splice 1. Next, the wedges of one of the aligning components 2 or 3 are removed from the grooves. This is done by applying a force C on the "wings" 11 (see FIG. 5). This causes the support 12, along with the wedges 4 to move in direction D. After the wedges 4 are removed from the grooves, the opening in the elastomer closes and the elastomer firmly holds the optical fiber in place. Next, care is take to make sure that the other fiber is still in contact with the firmly held fiber, and the wedges of the second aligning component are removed in the same matter. Finally, both aligning components 2, 3 are removed from the mechanical splice 1 and can be discarded.

One advantage of this invention is that the mechanical splice comes pre-equipped with the tool required to open and close the elastomer and these are disposable after the splice is completed. A great advantage is that the cost of the new technology is considerably lower and a special tool is no longer required to assemble the splice.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A mechanical splice apparatus, comprising:
a mechanical splice with a plurality of grooves, wherein the mechanical splice receives a first optical fiber through a first end of the mechanical splice, where the first optical fiber resides in a first portion of the mechanical splice, and the mechanical splice receives a second optical fiber through a second end of the mechanical splice, where the second optical fiber resides in a second portion of the mechanical splice;
a first aligning component with a first wedge, wherein, when the first wedge is engaged in a first groove of the plurality of grooves of the mechanical splice, a first opening is formed in the first portion of the mechanical splice, and, when the first wedge is disengaged from the first groove, the first opening closes; and
a second aligning component with a second wedge, wherein, when the second wedge is engaged in a second groove of the plurality of grooves of the mechanical splice, a second opening is formed in the second portion of the mechanical splice, and, when the second wedge is disengaged from the second groove, the second opening closes.

2. The mechanical splice apparatus according to claim 1, wherein the first aligning component comprises a plurality of first wedges, and
wherein, when the plurality of first wedges are engaged in the grooves of the mechanical splice, first openings are formed in the first portion of the mechanical splice; and, when the plurality of first wedges are disengaged from the grooves, the first openings close,
wherein the second aligning component comprises a plurality of second wedges, and
wherein, when the plurality of second wedges are engaged in the grooves of the mechanical splice, second openings are formed in the second portion of the mechanical splice; and, when the plurality of second wedges are disengaged from the grooves, the second openings close.

3. The mechanical splice apparatus according to claim 1, wherein the first aligning component comprises a plurality of structures that, when forces are asserted on the structures, the first wedge disengages from the first groove, and
wherein the second aligning component comprises a plurality of structures that, when forces are asserted on the structures, the second wedge disengages from the second groove.

4. The mechanical splice apparatus according to claim 3, wherein the first aligning component comprises a structure that, when a forces is asserted on the structure, the first wedge engages in the first groove, and
wherein the second aligning component comprises a structure that, when a forces is asserted on the structure, the second wedge engages in the second groove.

5. The mechanical splice apparatus according to claim 1, wherein end faces of the first and the second optical fibers meet at a middle portion of the mechanical splice, and the first portion extends from the first end to the middle portion and the second portion extends from the second end to the middle portion.

6. The mechanical splice apparatus according to claim 5, wherein the first aligning component opens and closes the entire first portion, and the second aligning component opens and closes the entire second portion.

* * * * *